United States Patent
Xing et al.

(10) Patent No.: US 11,477,780 B2
(45) Date of Patent: Oct. 18, 2022

(54) RADIO FRAME PROCESSING METHOD AND APPARATUS IN A MULTIPLE BSS SCENARIO

(71) Applicant: ZTE CORPORATION, Shenzhen (CN)

(72) Inventors: Weimin Xing, Shenzhen (CN); Zhiqiang Han, Shenzhen (CN); Kaiying Lv, Shenzhen (CN)

(73) Assignee: ZTE Corporation, Shenzhen (CN)

(*) Notice: Subject to any disclaimer, the term of this patent is extended or adjusted under 35 U.S.C. 154(b) by 348 days.

(21) Appl. No.: 16/346,482

(22) PCT Filed: Sep. 13, 2017

(86) PCT No.: PCT/CN2017/101623
§ 371 (c)(1),
(2) Date: Apr. 30, 2019

(87) PCT Pub. No.: WO2018/082403
PCT Pub. Date: May 11, 2018

(65) Prior Publication Data
US 2020/0367236 A1 Nov. 19, 2020

(30) Foreign Application Priority Data
Nov. 3, 2016 (CN) .......................... 201610974201.0

(51) Int. Cl.
*H04W 52/24* (2009.01)
*H04W 72/04* (2009.01)
(Continued)

(52) U.S. Cl.
CPC ...... *H04W 72/0446* (2013.01); *H04B 17/309* (2015.01); *H04W 52/241* (2013.01);
(Continued)

(58) Field of Classification Search
CPC ............. H04W 74/08; H04W 74/0808; H04W 74/0816; H04W 74/0825; H04W 16/16;
(Continued)

(56) References Cited

U.S. PATENT DOCUMENTS 10,257,859 B1* 4/2019 Chu ................. H04W 74/0808
2003/0123405 A1 7/2003 del Prado et al.
(Continued)

FOREIGN PATENT DOCUMENTS

CN 1462524 A 12/2003
CN 103458433 A 12/2013
(Continued)

OTHER PUBLICATIONS

International Search Report dated Oct. 27, 2017 for International Application No. PCT/CN2017/101623, 6 pages.
(Continued)

*Primary Examiner* — Salvador E Rivas
(74) *Attorney, Agent, or Firm* — Knobbe, Martens, Olson & Bear, LLP

(57) ABSTRACT

A radio frame processing method applied to a first station. The method includes: after detecting a first radio frame, determining whether the first station is in an associated state; if the first station is in the associated state, determining a home situation of the first radio frame according to first attribute information carried in the first radio frame and second attribute information corresponding to a first access point station with which the first station is associated, and performing carrier detection according to a first preset rule based on the home situation of the first radio frame; and if the first station is in an unassociated state, performing the carrier detection according to a second preset rule.

11 Claims, 6 Drawing Sheets

(51) Int. Cl.
  *H04W 74/08* (2009.01)
  *H04W 72/12* (2009.01)
  *H04B 17/309* (2015.01)
  *H04W 84/12* (2009.01)
  *H04W 74/00* (2009.01)

(52) U.S. Cl.
  CPC ... *H04W 72/1226* (2013.01); *H04W 74/0808* (2013.01); *H04W 72/0453* (2013.01); *H04W 74/00* (2013.01); *H04W 84/12* (2013.01)

(58) Field of Classification Search
  CPC ........... H04W 28/0808; H04W 52/241; H04W 72/0453; H04W 72/1226; H04W 74/00; H04B 7/2606; H04B 17/309; H04J 11/0056
  See application file for complete search history.

(56) References Cited

U.S. PATENT DOCUMENTS

| | | | |
|---|---|---|---|
| 2015/0271850 A1 | 9/2015 | Kim et al. | |
| 2016/0073429 A1* | 3/2016 | Oteri | H04W 4/08 370/338 |
| 2016/0174254 A1* | 6/2016 | Hedayat | H04W 74/006 370/329 |
| 2016/0174262 A1 | 6/2016 | Xing et al. | |
| 2017/0079067 A1 | 3/2017 | Li et al. | |
| 2017/0289987 A1* | 10/2017 | Seok | H04W 84/12 |
| 2017/0374681 A1* | 12/2017 | Kim | H04L 69/323 |

FOREIGN PATENT DOCUMENTS

| | | |
|---|---|---|
| CN | 10420755 A | 12/2014 |
| CN | 104202755 A | 12/2014 |
| CN | 104284441 A | 1/2015 |
| WO | 2016/087917 A1 | 6/2016 |

OTHER PUBLICATIONS

Written Opinion of the International Searching Authority dated Oct. 27, 2017 for International Application No. PCT/CN2017/101623, 3 pages.

Chu et al., "BSS Color and Multiple BSSID", Marvell, IEEE 802.11-16/0068r1—16 pages (Jan. 18, 2016).

Ko et al., "Discussions on Partial BSS Color", WILUS, IEEE 802.11-16/0918r1—16 pages (Sep. 12, 2016).

Khorov et al., "Multiple NAVs for Spatial Reuse", IITP, IEEE 802.11-15/1348—13 pages (Nov. 9, 2015).

Office Action of corresponding Japanese Patent Application No. 2019-522953 and its English Translation—8 pages (dated May 21, 2020).

Partial Supplementary European Search Report of corresponding Patent Application No. 17867782.9—19 pages (dated Apr. 24, 2020).

* cited by examiner

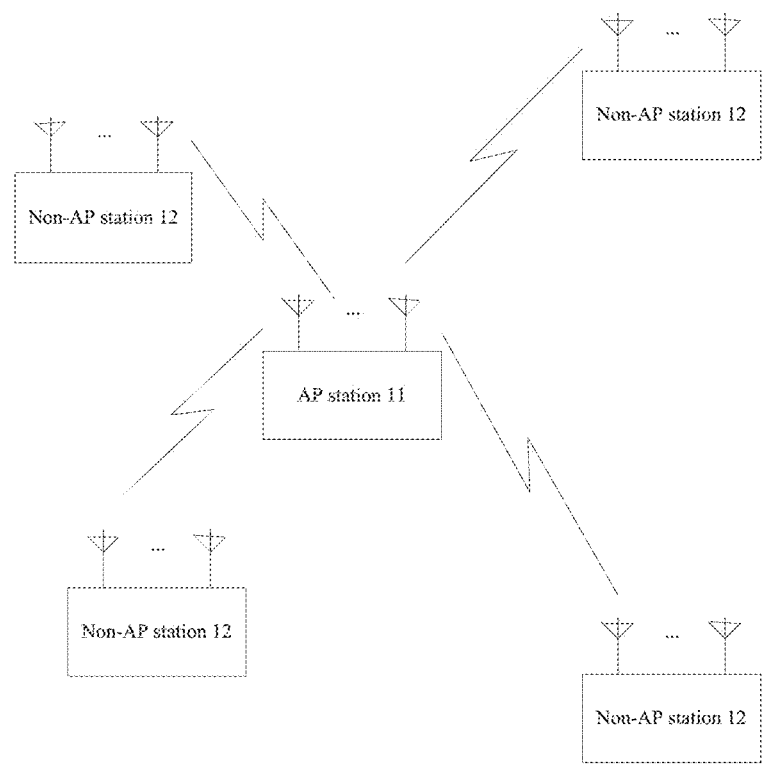
FIG. 1 --Prior art--

| Traditional training field | Traditional signaling field | VHT signaling field A | VHT training field | VHT signaling field B | Data load |

| Traditional training field | Traditional signaling field | Traditional signaling field | HE signaling field A | HE signaling field B | HE training field | Data load 1 |
| | | | | | HE training field | Data load 2 |

FIG. 3D

| Traditional training field | Traditional signaling field | Traditional signaling field | HE signaling field A | HE training field | Data load 1 |
| | | | | HE training field | Data load 2 |

FIG. 3E

Succeed in detecting a third radio frame — S401

Determine whether the third radio frame requires a subsequent radio frame to be transmitted after an interframe space and whether a station satisfies a condition for transmitting a subsequent response frame — S402

If the third radio frame requires the subsequent radio frame to be transmitted after the interframe space and the station does not satisfy the condition for transmitting the subsequent response frame, receive the third radio frame and update a network allocation vector of the station — S403

FIG. 4

RADIO FRAME PROCESSING METHOD AND APPARATUS IN A MULTIPLE BSS SCENARIO

CROSS-REFERENCE TO RELATED APPLICATIONS

This is a National Stage Application, filed under 35 U.S.C. 371, of International Patent Application No. PCT/CN2017/101623, filed on Sep. 13, 2017, which claims priority to Chinese patent application No. 201610974201.0 filed on Nov. 3, 2016, contents of both of which are incorporated herein by reference in their entireties.

TECHNICAL FIELD

The present disclosure relates to, but is not limited to, the field of communications and, in particular, relates to a radio frame processing method and apparatus.

BACKGROUND

A shared medium wireless network generally refers to a communication network which uses an unlicensed band. A well-known shared medium wireless network is a wireless local area network (WLAN). As shown in FIG. 1, an infrastructure network of the WLAN is a basic service set (BSS) composed of an access point (AP) station 11 and multiple non-AP stations 12 associated with the AP station 11. In this network structure, data is converged and distributed at the AP station. That is, communication is generally only performed between the non-AP station and the AP station. The relationship between the AP station and the non-AP station is similar to the relationship between a base station and a terminal in the cellular network.

SUMMARY

A summary of the subject matter is described hereinafter in detail. This summary is not intended to limit the scope of the claims.

In new WLAN techniques, a technology for avoiding interference and improving efficiency in a dense network deployment case has become a hot discussion point. For example, a station supporting new standards adds control information such as a network identifier (color bits, which is simply referred to as a Color) of a BSS to which the station belongs, a station identifier (ID), an uplink (UL) and downlink (DL) indication (UL flag), a space multiplexing parameter, a reserved transmission duration to a physical layer header of a radio frame in a new format so that a station which detects the radio frame may determine a subsequent radio frame load or a basic transmission situation based on the control information to determine a next operation. Meanwhile, a device supporting these new techniques may also determine a next step by detecting existing information such as a network identifier of a conventional radio frame. However, the above new techniques for reception, determination and processing do not cover all scenarios of the WLAN, and optimization is basically performed on multiple independent infrastructure BSSs; these new techniques supports neither optimization in a multiple BSS scenario nor detection and optimization of an unassociated station. Therefore, the radio frame will not be reasonably processed by means of the above new techniques for reception, determination and processing.

The present application provides a radio frame processing method and apparatus to implement radio frame processing in the multiple BSS scenario or an unassociated station scenario so that a station can detect and receive a radio frame with a reasonable virtual carrier or physical carrier detection parameter.

An embodiment of the present disclosure provides a radio frame processing method applied to a first station. The method includes steps described below.

After a first radio frame is detected, it is determined whether the first station is in an associated state.

If the first station is in the associated state, a home situation of the first radio frame is determined according to first attribute information carried in the first radio frame and second attribute information corresponding to a first AP station with which the first station is associated, and carrier detection is performed according to a first preset rule based on the home situation of the first radio frame.

If the first station is in an unassociated state, the carrier detection is performed according to a second preset rule.

In an exemplary embodiment, the step in which the home situation of the first radio frame is determined according to the first attribute information carried in the first radio frame and the second attribute information corresponding to the first AP station with which the first station is associated includes steps described below.

The first attribute information carried in the first radio frame is acquired, where the first radio frame is sent by a second station to a second AP station with which the second station is associated, and the first AP station and the second AP station belong to a same multiple BSS set.

According to the first attribute information and the second attribute information corresponding to the first AP station, it is determined whether the first radio frame is an intra-BSS radio frame to which the first station belongs and the home situation of the first radio frame is obtained.

In an exemplary embodiment, the step in which according to the first attribute information and the second attribute information corresponding to the first AP station, it is determined whether the first radio frame is the intra-BSS radio frame to which the first station belongs includes a step described below.

The first attribute information is matched with attribute information of any BSS in the multiple BSS set, where if the second attribute information matches the first attribute information, the first radio frame is determined to be the intra-BSS radio frame to which the first station belongs, and if the second attribute information does not match the first attribute information, the first radio frame is determined not to be the intra-BSS radio frame to which the first station belongs.

In an exemplary embodiment, the step in which the carrier detection is performed according to the first preset rule based on the home situation of the first radio frame includes steps described below.

If the home situation indicates that the first radio frame is the intra-BSS radio frame to which the first station belongs, physical carrier detection is performed using a first threshold, and an intra-BSS network allocation vector of the first station is updated.

If the home situation indicates that the first radio frame is an inter-BSS radio frame to which the first station belongs, the physical carrier detection is performed using a second threshold, and a basic network allocation vector of the first station is updated. The first threshold is lower than or equal to the second threshold.

In an exemplary embodiment, the step in which the intra-BSS network allocation vector of the first station is updated includes a step described below.

The intra-BSS network allocation vector of the first station is updated according to reserved channel time information carried in the first radio frame.

The step in which the basic network allocation vector of the first station is updated includes a step described below.

The basic network allocation vector of the first station is updated according to the reserved channel time information carried in the first radio frame.

In an exemplary embodiment, the first attribute information is partial BSS information of the second AP station in a partial association identifier field of the first radio frame, and the second attribute information is partial BSS information of any BSS in the multiple BSS set.

In an exemplary embodiment, the step in which it is determined whether the first station is in the associated state includes a step described below.

It is determined whether the first station is associated with an AP station or has a target AP station desired to be associated with.

Accordingly, the step in which if the first station is in the unassociated state, the carrier detection is performed according to the second preset rule includes a step described below.

If the first station is not associated with the AP station or does not have the target AP station desired to be associated with, physical carrier detection is performed using a first threshold, and a basic network allocation vector, or an intra-BSS network allocation vector, or both the basic network allocation vector and the intra-BSS network allocation vector of the first station is updated.

In an exemplary embodiment, the step in which a network allocation vector of the first station is updated includes a step described below.

The basic network allocation vector, or the intra-BSS network allocation vector, or both the basic network allocation vector and the intra-BSS network allocation vector of the first station is updated.

An embodiment of the present disclosure further provides a radio frame processing method applied to an AP station. The method includes steps described below.

After a second radio frame is detected, uplink and downlink identification information carried in the second radio frame is acquired.

A home situation of the second radio frame is determined according to at least the uplink and downlink identification information.

A network allocation vector of the AP station is updated according to the home situation of the second radio frame.

In an exemplary embodiment, the step in which the network allocation vector of the AP station is updated according to the home situation of the second radio frame includes a step described below.

If the home situation indicates that the second radio frame is an inter-BSS radio frame to which the AP station belongs, a basic network allocation vector of the AP station is updated.

Accordingly, wherein the method further includes a step described below.

If the home situation indicates that the second radio frame is an intra-BSS radio frame to which the AP station belongs, the network allocation vector of the AP station is not updated.

In an exemplary embodiment, the method further includes a step described below.

Network identification information carried in the second radio frame is acquired, where the network identification information belongs to a sender of the second radio frame.

Accordingly, the step in which the home situation of the second radio frame is determined according to at least the uplink and downlink identification information includes a step described below.

The home situation of the second radio frame is determined according to the uplink and downlink identification information and the network identification information.

In an exemplary embodiment, the step in which the home situation of the second radio frame is determined according to the uplink and downlink identification information and the network identification information includes steps described below.

After it is determined that the second radio frame is an uplink radio frame according to the uplink and downlink identification information, the network identification information is matched with network identification information of the AP station or network identification information of any BSS in a multiple BSS set to which the AP station belongs.

If the network identification information matches the network identification information of the AP station or the network identification information of any BSS in the multiple BSS set to which the AP station belongs, it is determined that the second radio frame is an intra-BSS radio frame to which the AP station belongs.

If the network identification information does not match the network identification information of the AP station or the network identification information of any BSS in the multiple BSS set to which the AP station belongs, it is determined that the second radio frame is an inter-BSS radio frame to which the AP station belongs.

In an exemplary embodiment, the step in which the home situation of the second radio frame is determined according to the uplink and downlink identification information and the network identification information includes a step described below.

After it is determined that the second radio frame is a downlink radio frame according to the uplink and downlink identification information, it is determined that the second radio frame is an inter-BSS radio frame to which the AP station belongs.

An embodiment of the present disclosure further provides a radio frame processing method. The method includes steps described below.

After a third radio frame is detected, it is determined whether the third radio frame requires a subsequent radio frame to be transmitted after an interframe space and whether a station satisfies a condition for transmitting a subsequent response frame.

If the third radio frame requires the subsequent radio frame to be transmitted after the interframe space and the station does not satisfy the condition for transmitting the subsequent response frame, the third radio frame is received and a network allocation vector of the station is updated.

In an exemplary embodiment, the third radio frame includes a trigger frame or trigger information for triggering uplink multi-user transmission.

In an exemplary embodiment, the step in which it is determined whether the station satisfies the condition for transmitting the subsequent response frame includes a step described below.

Physical/virtual carrier detection is performed, where if a detection result indicates that the physical carrier detection is busy, the virtual carrier detection is busy, or energy detected in the interframe space is higher than a preset threshold, the station is determined not to satisfy the condition for transmitting the subsequent response frame.

In an exemplary embodiment, after the third radio frame is detected, the method further includes steps described below.

It is determined whether the station is a transmission opportunity holder.

If the station is the transmission opportunity holder, the network allocation vector of the station is not updated.

In an exemplary embodiment, after the third radio frame is detected, the method further includes steps described below.

It is determined whether an immediate response to the third radio frame is required, where the third radio frame is transmitted by the transmission opportunity holder.

If the immediate response to the third radio frame is required, the network allocation vector of the station is not updated.

If the immediate response to the third radio frame is not required, the network allocation vector of the station is updated.

An embodiment of the present disclosure further provides a radio frame processing apparatus. The apparatus includes a first detection module, a first determination module, and a first update unit.

The first detection module is configured to detect a first radio frame.

The first determination module is configured to determine whether a first station is in an associated state after the first detection module succeeds in detecting the first radio frame.

The first update unit is configured to: if the first station is in the associated state, determine a home situation of the first radio frame according to first attribute information carried in the first radio frame and second attribute information corresponding to a first AP station with which the first station is associated, and perform carrier detection according to a first preset rule based on the home situation of the first radio frame; and if the first station is in an unassociated state, perform the carrier detection according to a second preset rule.

In an exemplary embodiment, the first update unit is configured to: acquire the first attribute information carried in the first radio frame, where the first radio frame is sent by a second station to a second AP station with which the second station is associated, and the first AP station and the second AP station belong to a same multiple BSS set; and determine, according to the first attribute information and the second attribute information corresponding to the first AP station, whether the first radio frame is an intra-BSS radio frame to which the first station belongs and obtain the home situation of the first radio frame.

An embodiment of the present disclosure further provides a radio frame processing apparatus. The apparatus includes a second detection unit, a first acquisition unit, and a second update unit.

The second detection unit is configured to detect a second radio frame.

The first acquisition unit is configured to acquire uplink and downlink identification information carried in the second radio frame after the second detection unit succeeds in detecting the second radio frame.

The second update unit is configured to determine, according to at least the uplink and downlink identification information, a home situation of the second radio frame; and determine whether to update a network allocation vector of an AP station according to the home situation of the second radio frame.

In an exemplary embodiment, the second update unit is configured to: if the home situation indicates that the second radio frame is an inter-BSS radio frame of a multiple BSS to which the AP station belongs, update a network allocation vector of the AP station; and if the home situation indicates that the second radio frame is an intra-BSS radio frame to which the AP station belongs, update no network allocation vector of the AP station.

An embodiment of the present disclosure further provides a radio frame processing apparatus. The apparatus includes a third detection unit, a second determination unit, and a third update unit.

The third detection unit is configured to detect a third radio frame.

The second determination unit is configured to determine whether the third radio frame requires a subsequent radio frame to be transmitted after an interframe space and whether a station satisfies a condition for transmitting a subsequent response frame after the third detection unit succeeds in detecting the third radio frame.

The third update unit is configured to: if the third radio frame requires the subsequent radio frame to be transmitted after the interframe space and the station does not satisfy the condition for transmitting the subsequent response frame, receive the third radio frame and update a network allocation vector of the station.

In an exemplary embodiment, the second determination unit is configured to perform physical/virtual carrier detection on the third radio frame, where if a detection result indicates that the physical carrier detection is busy, the virtual carrier detection is busy, or energy detected in the interframe space is higher than a preset threshold, the station is determined not to satisfy the condition for transmitting the subsequent response frame.

An embodiment of the present disclosure further provides a computer-readable storage medium, which is configured to store computer-executable instructions for implementing the above-mentioned radio frame processing method when the instructions are executed.

The embodiments of the present disclosure provide the radio frame processing method and apparatus. After the first radio frame is detected, it is determined whether the first station is in the associated state. If the first station is in the associated state, the home situation of the first radio frame is determined according to the first attribute information carried in the first radio frame and the second attribute information corresponding to the first AP station with which the first station is associated, and the network allocation vector of the first station is updated according to the home situation of the first radio frame. If the first station is in the unassociated state, the network allocation vector of the first station is updated. It can be seen that the radio frame processing method provided by the embodiments of the present disclosure implements radio frame processing for the multiple BSS scenario optimized detection of an unassociated station so as to enable a station to detect and receive a radio frame with a reasonable virtual carrier or physical carrier detection parameter.

Other aspects can be understood after the drawings and detailed description are read and understood.

BRIEF DESCRIPTION OF DRAWINGS

FIG. 1 is a structural diagram of a BSS;

FIG. 3D is a structural diagram of a HE multi-user radio frame;

FIG. 3E is a structural diagram of a HE trigger-based radio frame;

FIG. 4 is a flowchart of yet another radio frame processing method;

DETAILED DESCRIPTION

Embodiments of the present disclosure will be described hereinafter in conjunction with the drawings.

An embodiment of the present disclosure provides a radio processing method. The method may be applied to a first station. Referring to FIG. 1, the first station may be a non-AP station and a high efficient (HE) station. The first station may determine a home situation and an attribute of a radio frame detected by the first station to determine how to process the radio frame in a next step. The first station may be associated with an AP. At this time, the first station is in an associated state. The first station may be unassociated with the AP. At this time, the first station is in an unassociated state.

Figures 2A, 2B:
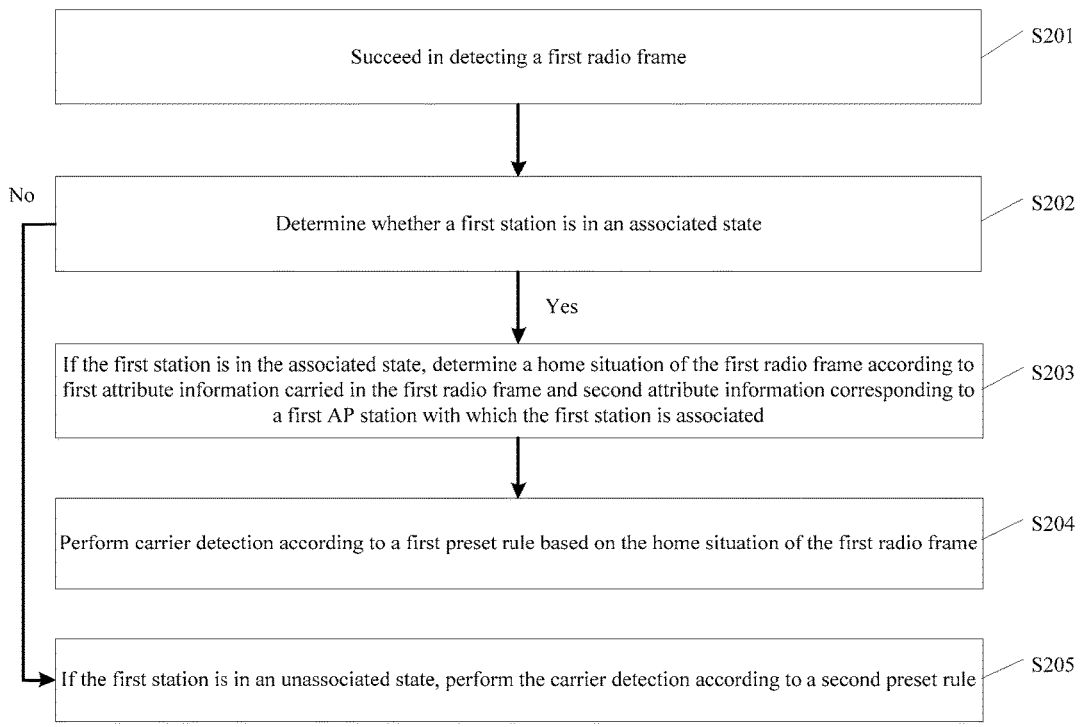
FIG. 2A is a flowchart of a radio frame processing method.
FIG. 2B is a structural diagram of a very high throughput (VHT) radio frame.

Referring to FIG. 2A, the method may include steps described below.

In S201, a first radio frame is detected.

Here, the first radio frame may be a radio frame in a very high throughput (VHT) format, for example, may be a VHT single-user radio frame or multi-user radio frame. Referring to FIG. 2B, a physical layer header of the first radio frame may include a traditional training field, a traditional signaling field, a VHT signaling field, and a VHT training field. Group identifier (GID) information may be carried in the signaling field. When the GID is 0, the first radio frame is an uplink radio frame sent to the AP. In an embodiment, the signaling field may also include a partial association identifier (ID) field which carries first attribute information.

In S202, whether the first station is in the associated state is determined. If yes, jump to S203; if not, jump to S205.

Here, the first station may monitor the radio frame. After the first station has detected the first radio frame, the first station may determine whether it is in the associated state. For example, the first station acquires its own station attribute information, and determines whether it is the non-AP station and whether it is associated with the AP station according to the station attribute information.

In S203, if the first station is in the associated state, a home situation of the first radio frame is determined according to the first attribute information carried in the first radio frame and second attribute information corresponding to a first AP station with which the first station is associated.

Here, the home situation of a radio frame refers to whether the radio frame is an intra-BSS radio frame of a BSS to which the first station belongs or not. In a case where the radio frame is not an intra-BSS radio frame, this radio frame is, for example, an inter-BSS radio frame.

In practical applications, the first station may be associated with the first AP station to establish a first BSS. A second station may be associated with a second AP station to establish a second BSS. The first BSS and the second BSS may belong to a same multiple BSS set. Here, each BSS is represented by BSS identification information, that is, a BSS ID. In this way, the multiple BSS set may also be a multiple BSS ID set.

At this time, after the first station determines that it is the non-AP station and it has been associated with the first AP station according to its own station attribute information, the first station may acquire the second attribute information corresponding to the first AP station such as partial BSS ID information of the first AP station. In an embodiment, for the multiple BSS set, the second attribute information may also be partial BSS ID information of any BSS ID of the multiple BSS ID set. The first attribute information carried in the first radio frame, such as partial BSS ID information of a receiver of the first radio frame, an AP station, may be compared with the second attribute information to determine the home situation of the first radio frame. For example, the first radio frame is sent by the second station to the second AP station with which the second station is associated. At this time, partial BSS ID information of the second AP station may be matched with the partial BSS ID information of any BSS ID of the multiple BSS ID set. If the partial BSS ID information of any BSS ID of the multiple BSS ID set matches the partial BSS ID information of the second AP station, it indicates that the first radio frame is an intra-BSS radio frame to which the first station belongs; if the partial BSS ID information of all BSS IDs of the multiple BSS ID set does not match the partial BSS ID information of the second AP station, it indicates that the first radio frame is not the intra-BSS radio frame to which the first station belongs.

It may be noted that, generally, after receiving the first radio frame, the first station may determine whether the first radio frame is in the VHT format and whether the first radio frame carries the GID information for indicating uplink and downlink. If the first radio frame is in the VHT format, and the GID information indicates that the first radio frame is an uplink radio frame, the first radio frame may carry the partial BSS ID information.

In S204, carrier detection is performed according to a first preset rule based on the home situation of the first radio frame.

Here, after the first station determines the home situation of the first radio frame, if the first radio frame is the intra-BSS radio frame to which the first station belongs, the first station may perform physical carrier detection using a first threshold, and update an intra-BSS network allocation vector of the first station. In an embodiment, the first station may determine whether a current channel is busy or idle by using an intra-BSS physical carrier detection threshold, that is, the first threshold, and then update the intra-BSS network allocation vector of the first station by using reserved channel time information carried in the first radio frame. Conversely, if the home situation indicates that the first radio frame is an inter-BSS radio frame to which the first station belongs, the first station may perform the physical carrier detection by using a second threshold, and update a basic network allocation vector of the first station. The first threshold may be less than or equal to the second threshold.

In practical applications, updating the intra-BSS network allocation vector of the first station may be setting the intra-BSS network allocation vector of the first station to a value of the reserved channel time information if the reserved channel time information carried in the first radio frame is greater than the intra-BSS network allocation vector of the first station. That is, the intra-BSS network allocation vector of the first station is compared with the received reserved channel time information, and a larger one of the intra-BSS network allocation vector and the received reserved channel time information is taken as a value of the intra-BSS network allocation vector of the first station. Similarly, updating the basic network allocation vector of the first station may be setting the basic network allocation vector to the value of the reserved channel time information if the reserved channel time information carried in the first radio frame is greater than the basic network allocation vector of the first station. That is, the basic network allocation vector is compared with the received reserved channel time information, and a larger one of the basic network allocation vector and the received reserved channel time information is taken as a value of the basic network allocation vector.

It may be noted that, in general cases, the first station may be the non-AP station and may maintain two network allocation vector timers, namely, the intra-BSS internal network allocation vector (NAV) and the common NAV. When the first station performs the carrier detection according to the first preset rule or a second preset rule, if the first radio frame is determined to be an intra-BSS radio frame, the intra-BSS network allocation vector may be updated; and conversely, the basic network allocation vector may be updated.

In particular, the first station may also maintain only one network allocation vector timer, that is, the basic network allocation vector. Then, updating the intra-BSS network allocation vector has no difference from updating the basic network allocation vector, which are to update the basic network allocation vector.

In S205, if the first station is in the unassociated state, the carrier detection is performed according to the second preset rule.

In an embodiment, in a WLAN, after the non-AP station is associated with the AP, it may generally be considered that the non-AP station is in the associated state. At this time, the non-AP station may know attribute information of a network with which the non-AP station is associated, such as a BSS ID and a BSS Color. However, after the first station has detected the first radio frame, the first station determines that it is not associated with any AP station or has no target AP station desired to be associated with, this is, the first station is in the unassociated state. At this time, the first station may perform the physical carrier detection using the first threshold described above, and update the basic network allocation vector, or the intra-BSS network allocation vector, or both the basic network allocation vector and the intra-BSS network allocation vector of the first station.

In an embodiment, how to determine the network allocation vector timer to be updated may be predefined by a protocol. For example, to better protect the existing transmission and network in this field, the first station may simultaneously update the basic NAV and the intra-BSS NAV. In an embodiment, to enable the first station to quickly perform operations such as an association request, the first station may only update the intra-BSS NAV. In this way, when necessary, the first station may ignore the NAV setting, and perform an association operation and the like in response to a trigger sent by the first AP station. It is not limited in the embodiments of the present disclosure.

In an embodiment, for a radio frame sent by the first station, a network identifier may be set to a special value since the first station has not joined in any network. For example, if the first station sends a radio frame in the VHT format, the partial BSS ID or a partial association ID (AID) may be set to 0; if the first station sends a radio frame in a HE format, the BSS Color may be set to 0, which is not limited in the embodiments of the present disclosure.

The embodiment described above provides the radio frame processing method for a multiple BSS scenario or optimized detection of an unassociated station so as to enable a station to detect and receive a radio frame with a reasonable virtual carrier or physical carrier detection parameter.

The radio frame processing method provided by the preceding embodiment is described by way of example in practical applications.

In a WLAN, a device may virtualize communications between multiple AP stations and multiple stations. For example, stations 1 to 5 are associated with an AP1 to form a BSS1, and the BSS ID of the AP1 is a media access control (MAC) address corresponding to the AP1 and is recorded as BSS ID1; stations 6 to 10 are associated with an AP2 to form a BSS2, and the BSS ID of the AP2 is an MAC address corresponding to the AP2 and is recorded as BSS ID2. Here, the BSS ID1 and the BSS ID2 belong to a multiple BSS ID set, and the BSS ID1 and the BSS ID2 are the same except specific bits. It is assumed that both the BSS ID1 and the BSS ID2 has 48 bits, and only the least significant N bits are different. For example, when N=4, bits b0 to b3 are different, where b0 is a 0th bit, the least significant bit, and b47 is the most significant bit. Although two BSSs and two APs are described above, only one device and one transceiving module is used in practice. Therefore, a traditional multiplexing mechanism cannot be used in the case of the multiple BSS ID set. For example, when the station 1 sends data to the AP1, the AP2 cannot receive another radio frame, and thus the AP2 cannot communicate with the station 6 to the station 10 in this case. Under the traditional multiplexing mechanism, if two APs are two devices, the two APs may simultaneously communicate with stations associated with the two APs through a space multiplexing mechanism and the like.

It is assumed that the station 1 and the station 6 are HE stations and that a station 2 and a station 7 are VHT stations, radio frame, a PHY-layer Protocol Data Unit (PPDU), sent by the station 2 and the station 7 are in a VHT format. A VHT single-user radio frame and a VHT multi-user radio frame have a same structure of a physical layer header. For the multiple BSS ID scenario, The devices where the AP1 and the AP2 are located notify the stations 1 to 10 in a transmitted beacon frame that the AP1 and the AP2 belong to one multiple BSS ID set, and notify the stations 1 to 10 of the BSS ID and the BSS ID2.

It may be noted that a complete BSS ID has 48 bits and is divided into 6 bytes (8 bits per byte). When the BSS ID is transmitted through a wireless medium from the most significant byte to the least significant byte and from the most significant bit to the least significant bit within each byte. The partial BSS ID information is the last transmitted M bits of the BSS ID. When M=9, a partial BSS ID is recorded as BSS ID [39:47]. In an order of bit significance, the partial BSS ID practically corresponds to b15, b0, b1, b2, b3, b4, b5, b6, b7 of the BSS ID. According to the preceding description, in the multiple BSS ID scenario, the BSS IDs of the two BSSs are different in bits b0 to b3. Therefore, it may be seen that the partial BSS ID information carried in the radio frame sent by the station 2 is different from the partial BSS ID information carried in the radio frame sent by the station 7, but a same device receives the two radio frames.

The station 7 sends an uplink radio frame in the VHT format to the AP2. A VHT signaling field (VHT-SIG) in a physical layer signaling field of the radio frame in the VHT format, i.e., a VHT signaling field A in FIG. 2B, carries a GID field. The GID field set to 0 indicates a single-user uplink radio frame sent to the AP. The VHT signaling field A further carries a partial AID field. The partial AID field is set to the partial BSS ID information of the AP with which the station 7 is associated, that is, the partial BSS ID information of the AP2. The partial BSS ID information is, for example, the above specific bits of the BSS ID2.

First, after the station 1 has detected the VHT radio frame sent by the station 7, the station 1 may acquire an attribute of the radio frame through the VHT signaling field. Next, the station 1 may acquire its own station attribute and a network attribute, and determine whether the station 1 itself is a non-AP station and is associated with the AP1 according to the acquired station attribute and the network attribute. If the station 1 is the non-AP station and is associated with the AP1, whether the AP1 belongs to the multiple BSS ID set may be determined. If the AP1 belongs to the multiple BSS ID set, the station 1 may learn that the multiple BSS ID set further includes the AP2 besides the AP1, as well as the BSS ID1 and the BSS ID2. Accordingly, a partial BSS ID1 and a partial BSS ID2 may also be known.

Next, the station 1 may match the partial BSS ID information carried in the radio frame with the partial BSS ID information of any BSS ID of the multiple BSS ID set to which the AP1, which which the station 1 is associated, belongs. If the partial BSS ID information carried in the radio frame matches the partial BSS ID information of any BSS ID, the station 1 may determine that the first radio frame is an intra-BSS radio frame. At this time, although the station 1 and the station 7 belong to different BSSs, since the APs with which the station 1 and the station 7 are associated belong to the same multiple BSS ID set, the station 1 may still consider the VHT frame received from the station 7 as a radio frame sent by a station in the same BSS as the station 1.

In an embodiment, the station 1 may also determine busyness using an intra-BSS physical carrier detection threshold, and update a network allocation vector of the station 1 according to reserved channel time information carried in the radio frame. For example, if reservation time carried in the radio frame is greater than a value of a current NAV timer, the reservation time information in the radio frame may be used for updating the NAV. In addition, if the station 1 maintains two NAV timers, i.e., one for basic NAV/inter-BSS NAV and one for intra-BSS NAV, the station 1 may update the intra-BSS NAV after receiving the radio frame from the station 7.

The radio frame processing method provided by the preceding embodiment is described with conjunction with another example in practical applications.

In a WLAN, after a non-AP station is associated with an AP, it may generally be considered that the non-AP station is in an associated state. At this time, the non-AP station may know a situation of a network associated with the non-AP station, such as a BSS ID and a Color. Generally, the station may be in an unassociated state at the beginning.

Then, after a station has detected a radio frame, if the station determines that it is not associated with any AP or has no target AP to be associated with, the station may detect the radio frame using an intra-BSS physical carrier detection threshold and update a basic network allocation vector, or an intra-BSS network allocation vector, or both the basic network allocation vector and the intra-BSS network allocation vector of the station.

Here, the intra-BSS physical carrier detection threshold used by the station may be a value predefined by a protocol, such as −82 dBm or a smaller value, to prevent an unassociated station from using a too high threshold to contend for a channel to interfere with an existing network. The intra-BSS physical carrier detection threshold may also have another value, which is not limited in the embodiments of the present disclosure.

In an embodiment, for a station which has not been associated with the AP but has detected a certain AP station and wants to be associated with the AP station, a processing method may be that the unassociated station may consider a BSS of the AP to be associated with as its own BSS. That is, though the station has not been associated with the AP, the station processes a radio frame by a method of the associated station according to the embodiments described above.

In addition, since the unassociated station has not joined in any network, a network identifier of a radio frame sent by the unassociated station may be set to a special value. For example, if a radio frame in a VHT format is sent, a partial BSS ID/AID may be set to 0; if a radio frame in a HE format is sent, a value of a BSS Color may be set to 0.

Based on the embodiments described above, an embodiment of the present disclosure further provides another radio frame processing method. The method may be applied to an AP station.

Figure 3A:
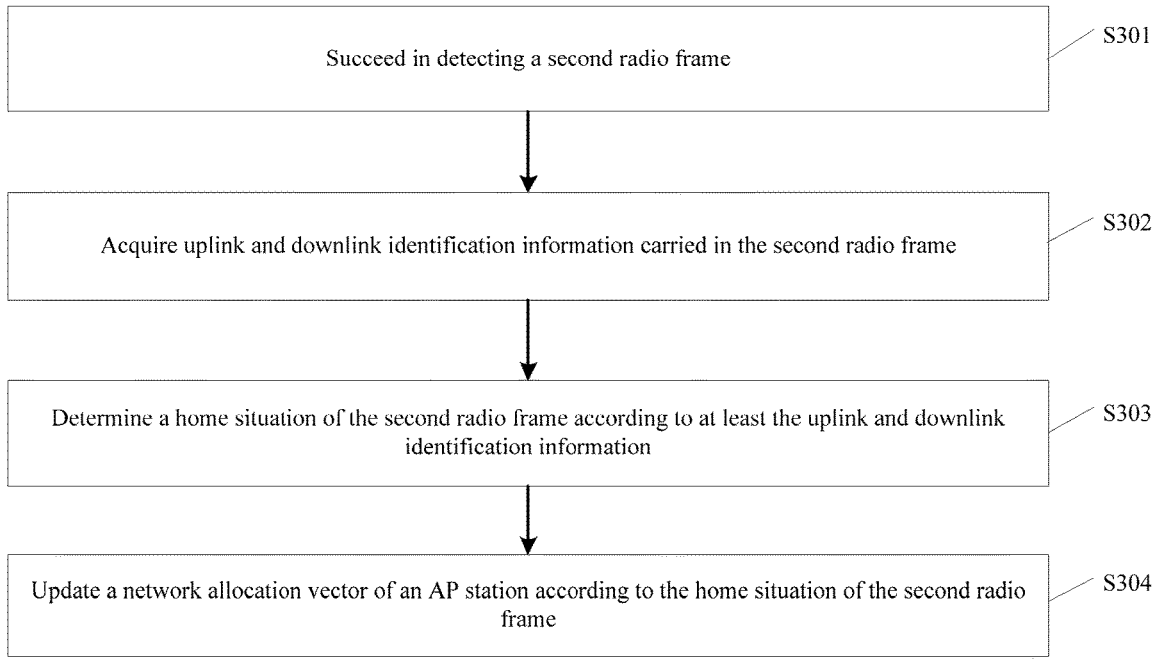
FIG. 3A is a flowchart of another radio frame processing method.

Referring to FIG. 3A, the method may include steps described below.

In S301, a second radio frame is detected.

In S302, uplink and downlink identification information carried in the second radio frame is acquired.

Here, if the second radio frame is in a VHT format, the uplink and downlink identification information may be a GID. For example, if the GID is 0, it indicates that the second radio frame is an uplink radio frame; if the second radio frame is in a HE single-user or multi-user format, an uplink and downlink indication identifier may be UL flag information or UL/DL indication information, and the uplink and downlink indication identifier indicates uplink. The second radio frame may also be a HE trigger-based radio frame, which is not limited in the embodiments of the present disclosure.

In another embodiment of the present disclosure, if the second radio frame is a VHT single-user radio frame, the uplink and downlink indication identifier may be the GID. The GID equal to 63 indicates a downlink single-user radio frame, and the GID equal to 1 to 62 indicates a downlink multi-user radio frame. If the second radio frame is a VHT multi-user radio frame, only a downlink radio frame may be allowed to be sent. If the second radio frame is a HE single-user or multi-user radio frame, the uplink and downlink indication identifier may be UL flag information and indicates downlink, which is not limited in the embodiments of the present disclosure.

Figure 3B:
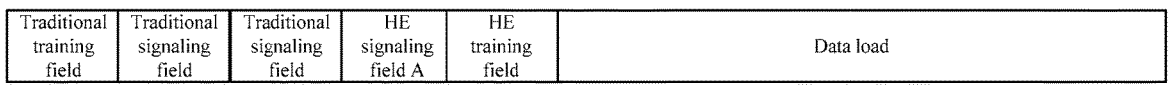
FIG. 3B and FIG. 3C each are a structural diagram of a high efficient (HE) single-user radio frame.
Figure 3C:
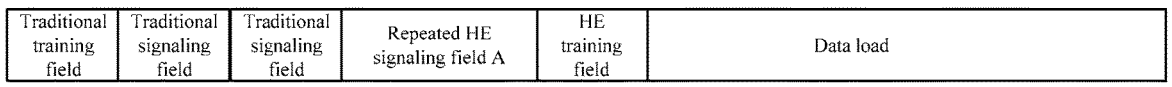

It may be noted that the HE format of the radio frame may include: a HE single-user format shown in FIG. 3B and FIG. 3C, a HE multi-user format shown in FIG. 3D, and a HE trigger-based format shown in FIG. 3E. The HE single-user format may be further divided into a basic format shown in FIG. 3B and an extended format shown in FIG. 3C. A HE signaling field is repeatedly transmitted in the extended format, which can improve reliability and coverage. The HE multi-user format may generally be simultaneously sent by the AP station to multiple non-AP stations (STAs). However, the non-AP STA may also be allowed to send the radio frame in the HE multi-user format, but only one data load portion and the like is included. That is, single-user information is transmitted in the multi-user format. The HE trigger-based format may be used by multiple non-AP STAs to simultaneously send data to the AP station.

In S303, a home situation of the second radio frame is determined according to at least the uplink and downlink identification information.

In an implementation process, after S301, the AP station may further acquire network identification information carried in the second radio frame. The network identification information may belong to a sender of the second radio frame. In an embodiment, the network identification information may be BSS ID information, partial BSS ID/AID information, BSS Color information, or partial BSS Color information.

Accordingly, S303 may include that the home situation of the second radio frame according to the uplink and downlink identification information and the network identification information.

In an embodiment, after the second radio frame is determined to be an uplink radio frame according to the uplink and downlink identification information, the network identification information is matched with network identification information of the AP station and network identification information of any BSS in a multiple BSS set to which the AP station belongs. If the network identification information matches the network identification information of the AP station or the network identification information of any BSS in the multiple BSS set to which the AP station belongs, the second radio frame is determined to be an intra-BSS radio frame to which the AP station belongs. If the network identification information does not match the network identification information of the AP station or the network identification information of any BSS in the multiple BSS set to which the AP station belongs, the second radio frame is determined to be an inter-BSS radio frame of the multiple BSS set.

In another embodiment of the present disclosure, after the second radio frame is determined to be a downlink radio frame according to the uplink and downlink identification information, no matter whether the network identification information matches the network identification information of any BSS in the multiple BSS set to which the AP station belongs, the second radio frame may be determined to be the inter-BSS radio frame to which the AP station belongs.

In S304, a network allocation vector of the AP station is updated according to the home situation of the second radio frame.

Here, S304 may include that, if the home situation indicates that the second radio frame is the inter-BSS radio frame of the multiple BSS set to which the AP station belongs, a basic network allocation vector of the AP station is updated; and if the home situation indicates that the second radio frame is the intra-BSS radio frame to which the AP station belongs, the network allocation vector of the AP station is not updated.

For example, the second radio frame detected/received by the AP station carries the uplink and downlink indication identifier from which whether the second radio frame is the uplink radio frame sent to the AP station may be determined. In an embodiment, whether the AP station is a target AP station is determined according to the network identification information carried in the second radio frame. If the second radio frame is the uplink radio frame sent to the AP station and the AP station is the target AP station, the AP station may determine that the second radio frame is sent by a station in a network established by the AP station to the AP station itself. In particular, in a scenario of a multiple BSS ID set, if the network identification information carried in the second radio frame matches any network identifier of the multiple BSS ID set, the AP station may determine that the second radio frame is sent to the AP station itself, and at this time, the AP station may not update the network allocation vector.

Another radio frame processing method provided by the preceding embodiment is described by way of example in practical applications.

In a WLAN, an AP station serves as a special station, and a non-AP station associated with the AP station generally needs to communicate with the AP station. The AP station detects and determines a home situation of a radio frame in a different manner from the non-AP station.

In an embodiment, after the AP has detected the radio frame, the AP may determine a processing manner according to a network identifier, or an uplink and downlink identifier, or both the network identifier and the uplink and downlink identifier. For example, the AP detects a radio frame sent by a station in a network established by the AP to the AP itself. At this time, the AP may not update the network allocation vector.

For example, the AP may determine whether the radio frame is an uplink radio frame sent to the AP itself according to an uplink and downlink indication identifier carried in the received radio frame. The AP may also determine whether the AP is a target AP according to network identification information carried in the radio frame. If the radio frame is the uplink radio frame sent to the AP and the AP is the target AP, the AP may determine that the radio frame is sent by the station in the network established by the AP to the AP itself. In particular, in a scenario of a multiple BSS ID set, if the network identification information carried in the radio frame matches any network identifier of the multiple BSS ID set, the AP station may determine that the radio frame is sent to the AP station itself.

In addition, if the AP station detects a downlink radio frame, that is, a radio frame generally sent by an AP, the AP may substantially determine that the radio frame is sent by another network or a direct-connected station in the network. At this time, the AP station may update its own network allocation vector.

Based on the embodiments described above, an embodiment of the present disclosure further provides yet another radio frame processing method. Referring to FIG. 4, the method may include steps described below.

In S401, a third radio frame is detected.

Here, the third radio frame may include a trigger frame or trigger information for triggering uplink multi-user transmission.

In S402, whether the third radio frame requires a subsequent radio frame to be transmitted after an interframe space and whether a station satisfies a condition for transmitting a subsequent response frame are determined.

Here, the interframe space may be a short interframe space (SIFS), and the subsequent radio frame may be a response frame of a radio frame or a new transmission frame for a frame exchange initiated by the station.

Here, whether the station satisfies the condition for transmitting the subsequent response frame may be determined by performing physical/virtual carrier detection. If a detection result indicates that the physical carrier detection is busy, the virtual carrier detection is busy, or energy detected in the interframe space is higher than a preset threshold, the station is determined not to satisfy the condition for transmitting the subsequent response frame.

In S403, if the third radio frame requires the subsequent radio frame to be transmitted after the interframe space and the station does not satisfy the condition for transmitting the subsequent response frame, the third radio frame is received and a network allocation vector of the station is updated.

In an embodiment, if the station determines that the radio frame requires the subsequent radio frame to be transmitted after the interframe space and the station does not satisfy the condition for transmitting the subsequent response frame, the station receives the radio frame is received and updates the NAV of the station.

In another embodiment of the present disclosure, after the third radio frame is detected, the method may further include that whether the station is a transmission opportunity holder is determined; and if the station is the transmission opportunity holder, the network allocation vector of the station is not updated.

That is to say, if the station is a transmission opportunity holder and the radio frame is sent to the station, the station determines a manner for processing the radio frame, which may include that the station receives the radio frame and do not update the NAV no matter whether the radio frame requires the station to send the subsequent radio frame after the interframe space and no matter whether the station satisfies the condition for transmitting the subsequent response frame.

In another embodiment of the present disclosure, after the third radio frame is detected, the method may further include that whether an immediate response to the third radio frame is required is determined, where the third radio frame is transmitted by the transmission opportunity holder; if the immediate response to the third radio frame is required, the network allocation vector of the station is not updated; and; if the immediate response to the third radio frame is not required, the network allocation vector of the station is updated.

In an embodiment, multiple stations in a WLAN share radio channel resources. Generally, a station which has successfully acquired the channel resources is referred to as the transmission opportunity holder or a service period owner. Generally, the station, as a resource acquirer, obtains a transmission opportunity and may have a privilege on physical carrier detection and virtual carrier detection mechanisms. In this embodiment, if the resource acquirer has detected the radio frame, a network identifier of the radio frame is equal to a network identifier of the station, and an identifier of a receiver is equal to an identifier of the station (that is, the radio frame detected by the resource acquirer is sent by a station that communicates with the resource acquirer to the resource acquirer itself), the resource acquirer station may not update the NAV no matter whether the resource acquirer station responds to the radio frame sent to itself. Other stations may update their NAVs. In addition, taking the transmission opportunity as an example, a transmission opportunity responder may determine whether to update the NAV according to whether the immediate response to the radio frame sent by the transmission opportunity holder is required. For example, if the immediate response is required, the NAV is not updated; if the immediate response is not required, the NAV is updated.

Yet another radio frame processing method provided by the preceding embodiment is described by way of example in practical applications.

Generally, simultaneous data transmission by multiple non-AP stations to an AP station may be referred to as uplink multi-user transmission. To perform successful transmission, an AP is generally required to send a trigger frame to multiple stations. After receiving the trigger frame, the multiple stations simultaneously send data to the AP in response to the trigger frame. However, to prevent the data sent by the multiple stations from interfering with other networks, generally, a station may perform carrier detection to determine whether the station satisfies a response condition before responding to the AP. If the response condition is not satisfied, the station may not respond to the AP, and the station which does not satisfy the response condition may update a network allocation vector.

For example, the AP sends the trigger frame or trigger information to trigger a STA1 to a STA4 to perform the uplink multi-user transmission after the STA1 to the STA4 receive the trigger frame. The STA1 to the STA4 perform the carrier detection before responding to the AP to determine whether they satisfy the response condition. Assuming that the STA1 does not satisfy the response condition, the STA1 sends no response, and the STA1 may update the NAV such as an intra-BSS NAV according to the trigger frame. Assuming that a STA2 to the STA4 satisfy the response condition, the STA2 to the STA4 perform uplink transmission and may not update the NAV.

Figure 5:
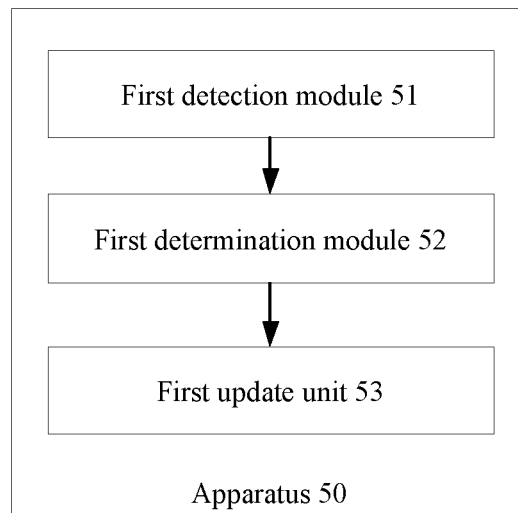
FIG. 5 is a structural diagram of a radio frame processing apparatus.

Based on a same inventive concept, an embodiment of the present disclosure further provides a radio frame processing apparatus. Referring to FIG. 5, the apparatus 50 may include a first detection module 51, a first determination module 52, and a first update unit 53.

The first detection module 51 is configured to detect a first radio frame.

The first determination module 52 is configured to determine whether a first station is in an associated state after the first detection module has detected the first radio frame.

The first update unit 53 is configured to: if the first station is in the associated state, determine a home situation of the first radio frame according to first attribute information carried in the first radio frame and second attribute information corresponding to a first access point (AP) station with which the first station is associated, and perform carrier detection according to a first preset rule based on the home situation of the first radio frame; and if the first station is in an unassociated state, perform the carrier detection according to a second preset rule.

In another embodiment of the present disclosure, the first update unit may be configured to: acquire the first attribute information carried in the first radio frame, where the first radio frame is sent by a second station to a second AP station with which the second station is associated, and the first AP station and the second AP station belong to a same multiple basic service set (BSS) set; and determine, according to the first attribute information and the second attribute information corresponding to the first AP station, whether the first radio frame is an intra-BSS radio frame to which the first station belongs and obtain the home situation of the first radio frame.

In another embodiment of the present disclosure, the first update unit may be configured to match the first attribute information with attribute information of any BSS in the multiple BSS set. If the second attribute information matches the first attribute information, the first radio frame is determined to be the intra-BSS radio frame to which the first station belongs; and if the second attribute information does not match the first attribute information, the first radio frame is determined not to be the intra-BSS radio frame to which the first station belongs.

In another embodiment of the present disclosure, the first update unit may be configured to: if the home situation indicates that the first radio frame is the intra-BSS radio frame to which the first station belongs, perform physical carrier detection using a first threshold, and update an intra-BSS network allocation vector of the first station; and if the home situation indicates that the first radio frame is an inter-BSS radio frame to which the first station belongs, perform the physical carrier detection using a second threshold, and update a basic network allocation vector of the first station. The first threshold is lower than or equal to the second threshold.

In another embodiment of the present disclosure, the first update unit may be configured to update the intra-BSS network allocation vector or the basic network allocation vector of the first station according to reserved channel time information carried in the first radio frame.

In another embodiment of the present disclosure, the first determination module may be configured to determine whether the first station is associated with an AP station or has a target AP station desired to be associated with. Accordingly, the first update unit may be further configured to: if the first station is not associated with the AP station or does not have the target AP station desired to be associated with, perform the physical carrier detection using the first threshold, and update the basic network allocation vector, or the intra-BSS network allocation vector, or both the basic network allocation vector and the intra-BSS network allocation vector of the first station.

In another embodiment of the present disclosure, the first update unit may be configured to update the basic network allocation vector, or the intra-BSS network allocation vector, or both the basic network allocation vector and the intra-BSS network allocation vector of the first station.

It may be noted that the above description of the apparatus embodiment is similar to the description of the method embodiment described above, and has similar beneficial effects as the method embodiment, which will not be repeated here. For the technical details not disclosed in the apparatus embodiment of the present disclosure, please understand the technical details with reference to the description of the method embodiment of the present disclosure. In order to save space, what has been described will not be repeated herein.

Figure 6:
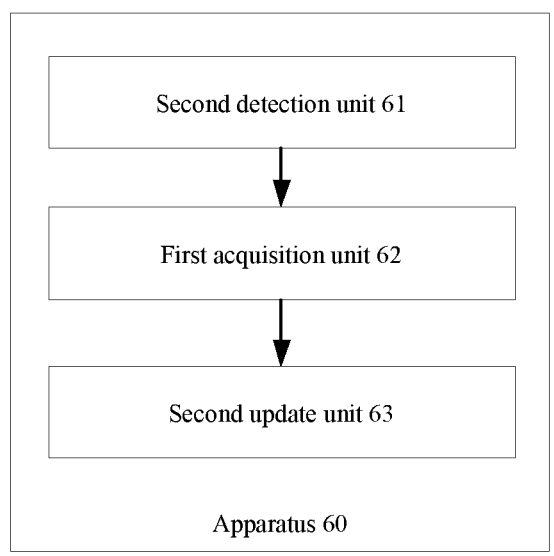
FIG. 6 is a structural diagram of another radio frame processing apparatus.

Based on a same inventive concept, an embodiment of the present disclosure further provides another radio frame processing apparatus. Referring to FIG. 6, the apparatus 60 may include a second detection unit 61, a second acquisition unit 62, and a second update unit 63.

The second detection unit 61 is configured to detect a second radio frame.

The first acquisition unit 62 is configured to acquire uplink and downlink identification information carried in the second radio frame after the second detection unit has detected the second radio frame.

The second update unit 63 is configured to determine, according to at least the uplink and downlink identification information, a home situation of the second radio frame; and determine whether to update a network allocation vector of an access point (AP) station according to the home situation of the second radio frame.

In another embodiment of the present disclosure, the second update unit may be configured to: if the home situation indicates that the second radio frame is an inter-BSS radio frame of a basic service set (BSS) to which the AP station belongs, update a basic network allocation vector of the AP station; and if the home situation indicates that the second radio frame is an intra-BSS radio frame to which the AP station belongs, update no network allocation vector of the AP station.

In another embodiment of the present disclosure, the apparatus may further include a second acquisition unit. The second acquisition unit is configured to acquire network identification information carried in the second radio frame, where the network identification information belongs to a sender of the second radio frame. Accordingly, the second update unit may be configured to determine, according to the uplink and downlink identification information and the network identification information, the home situation of the second radio frame.

In another embodiment of the present disclosure, the second update unit may be configured to: after the second radio frame is determined to be an uplink radio frame according to the uplink and downlink identification information, match the network identification information with network identification information of the AP station or network identification information of any BSS in a multiple BSS set to which the AP station belongs; if the network identification information matches the network identification information of the AP station or the network identification information of any BSS in the multiple BSS set to which the AP station belongs, determine that the second radio frame is the intra-BSS radio frame to which the AP station belongs; and if the network identification information does not match the network identification information of the AP station or the network identification information of any BSS in the multiple BSS set to which the AP station belongs, determine that the second radio frame is the inter-BSS radio frame to which the AP station belongs.

In another embodiment of the present disclosure, the second update unit may be configured to: after the second radio frame is determined to be a downlink radio frame according to the uplink and downlink identification information, determine that the second radio frame is the inter-BSS radio frame to which the AP station belongs.

It may be noted that the above description of the apparatus embodiment is similar to the description of the method embodiment described above, and has similar beneficial effects as the method embodiment, which will not be repeated here. For the technical details not disclosed in the apparatus embodiment of the present disclosure, please understand the technical details with reference to the description of the method embodiment of the present disclosure. In order to save space, what has been described will not be repeated herein.

Figure 7:
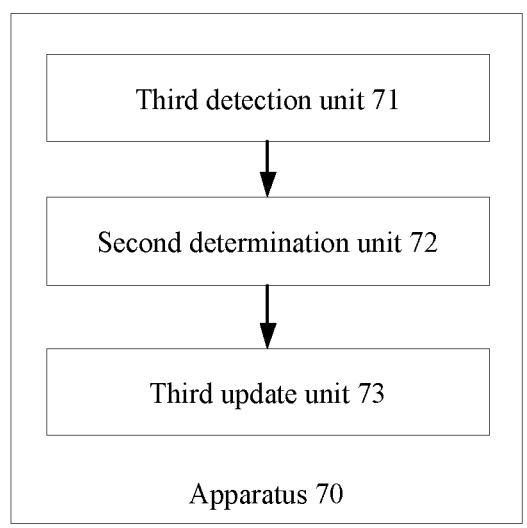
FIG. 7 is a structural diagram of yet another radio frame processing apparatus.

Based on a same inventive concept, an embodiment of the present disclosure further provides yet another radio frame processing apparatus. Referring to FIG. 7, the apparatus 70 may include a third detection unit 71, a second determination unit 72, and a third update unit 73.

The third detection unit 71 is configured to detect a third radio frame.

The second determination unit 72 is configured to determine whether the third radio frame requires a subsequent radio frame to be transmitted after an interframe space and whether a station satisfies a condition for transmitting a subsequent response frame after the third detection unit has detected the third radio frame.

The third update unit 73 is configured to: if the third radio frame requires the subsequent radio frame to be transmitted after the interframe space and the station does not satisfy the condition for transmitting the subsequent response frame, receive the third radio frame and update a network allocation vector of the station In another embodiment of the present disclosure, the second determination unit may be configured to perform physical/virtual carrier detection on the third radio frame. If a detection result indicates that the physical carrier detection is busy, the virtual carrier detection is busy, or energy detected in the interframe space is higher than a preset threshold, the station is determined not to satisfy the condition for transmitting the subsequent response frame.

In another embodiment of the present disclosure, the second determination unit may be further configured to determine whether the station is a transmission opportunity holder after the third radio frame is acquired. Accordingly, the third update unit may be further configured to: if the station is the transmission opportunity holder, update no network allocation vector of the station.

In another embodiment of the present disclosure, the second determination unit may be further configured to determine whether an immediate response to the third radio frame is required after the third radio frame is acquired, where the third radio frame is transmitted by the transmission opportunity holder. Accordingly, the third update unit may be further configured to: if the immediate response to the third radio frame is required, update no network allocation vector of the station; and if the immediate response to the third radio frame is not required, update the network allocation vector of the station.

It may be noted that the above description of the apparatus embodiment is similar to the description of the method embodiment described above, and has similar beneficial effects as the method embodiment, which will not be repeated here. For the technical details not disclosed in the apparatus embodiment of the present disclosure, please understand the technical details with reference to the description of the method embodiment of the present disclosure. In order to save space, what has been described will not be repeated herein.

An embodiment of the present disclosure further provides a computer-readable storage medium, which is configured to store computer-executable instructions for implementing the above-mentioned radio frame processing method when the instructions are executed.

It may be understood that "one embodiment" or "an embodiment" mentioned throughout the specification means that a particular feature, structure or characteristic related to the embodiments is included in at least one embodiment of the present disclosure. Therefore, the appearance of the phrase "in one embodiment" or "in an embodiment" in various places throughout the specification is not necessarily referring to the same embodiment. In addition, these particular features, structures or characteristics may be combined in one or more embodiments in any suitable manner. It may be understood that in various embodiments of the present disclosure, the serial numbers of the above processes do not mean the execution order and the execution order of the above processes should be determined according to their functions and internal logics, which should not limit the implementation of the embodiments of the present disclosure in any improper way. The serial numbers of the embodiments described above of the present disclosure are merely for ease of description and do not indicate superiority and inferiority of the embodiments.

It may be noted that as used herein, the term "comprising", "including" or any other variant thereof is intended to encompass a non-exclusive inclusion so that a process, method, article or apparatus that includes a series of elements not only includes the expressly listed elements but also includes other elements that are not expressly listed or are inherent to such the process, method, article or apparatus. In the absence of more restrictions, the elements defined by the statement "including a . . . " do not exclude the presence of additional identical elements in the process, method, article or apparatus that includes the elements.

It may be understood that the devices and the methods disclosed in the embodiments of the present disclosure may be implemented in other ways. The device embodiments described above are merely illustrative. For example, the unit division is merely a logical function division, and, in practice, the unit division may be implemented in other ways. For example, multiple units or components may be combined or may be integrated into another system, or some features may be omitted or not executed. In addition, coupling, direct coupling, or communication connections between the presented or discussed different components may be indirect coupling or communication connections, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to practical requirements to achieve the present disclosure.

Moreover, various function units in each of the multiple embodiments of the present disclosure may all be integrated in one processing unit, or each unit may be used as a separate unit, or two or more units may be integrated into one unit. The integrated function unit may be implemented by hardware or may be implemented by hardware plus a software function unit.

It may be understood by those skilled in the art that all or part of the steps in the method embodiments described above may be implemented by hardware related to program instructions, these programs may be stored in a computer-readable storage medium, and, when executed, these programs execute steps including the method embodiments described above; and the preceding storage medium includes various media capable of storing program codes, such as a removable storage device, a read-only memory (ROM), a magnetic disk or an optical disk.

In an embodiment, the above-mentioned integrated units in the embodiments of the present disclosure may also be stored in the computer-readable storage medium if implemented in the form of a software function module and sold or used as an independent product. Based on this understanding, the embodiments of the present disclosure substantially, or the part contributing to the related art, may be embodied in the form of a software product. The computer software product is stored in a storage medium and includes several instructions for enabling a computer device (which may be a personal computer, a server or a network device, etc.) to execute all or part of the method according to each of the embodiments of the present disclosure. The preceding storage medium includes various media capable of storing program codes, such as a removable storage device, a ROM, a magnetic disk or an optical disk.

It may be understood by those skilled in the art that function modules/units in all or part of the steps of the method, the system and the apparatus disclosed above may be implemented as software, firmware, hardware and appropriate combinations thereof. In the hardware implementation, the division of the function modules/units mentioned in the above description may not correspond to the division of physical components. For example, one physical component may have several functions, or one function or step may be implemented jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer-storage medium include, but is not limited to, a random access memory (RAM), a read-only memory (ROM), an electrically erasable programmable read-only memory (EEPROM), a flash memory, or other memory technologies, a compact disc read-only memory (CD-ROM), a digital versatile disc (DVD) or other optical disc storage, a magnetic cassette, a magnetic tape, disk storage or other magnetic storage apparatus, or any other medium used to store the desired information and accessible by a computer. In addition, as is known to those skilled in the art, the communication medium generally includes computer-readable instructions, data structures, program modules or other data in modulated data signals such as carriers or other transmission mechanisms, and may include any information delivery medium.

INDUSTRIAL APPLICABILITY

The embodiments of the present disclosure provide the radio frame processing method and apparatus. After the first radio frame is detected, it is determined whether the first station is in the associated state. If the first station is in the associated state, the home situation of the first radio frame is determined according to the first attribute information carried in the first radio frame and the second attribute information corresponding to the first AP station with which the first station is associated, and the network allocation vector of the first station is updated according to the home situation of the first radio frame. If the first station is in the unassociated state, the network allocation vector of the first station is updated. It can be seen that the radio frame processing methods provided by the embodiments of the present disclosure implement radio frame processing for the multiple BSS scenario or optimized detection of an unassociated station so as to enable a station to detect and receive a radio frame with a reasonable virtual carrier or physical carrier detection parameter.

What is claimed is:

1. A radio frame processing method, applied to a first station, comprising:
    after detecting a first radio frame, determining whether the first station is in an associated state with a first access point (AP) station;
    in response to determining that the first station is in the associated state, determining a home situation of the first radio frame according to first attribute information carried in the first radio frame and second attribute information corresponding to the first AP station, and performing carrier detection according to a first preset rule based on the home situation of the first radio frame, wherein the home situation is selected from intra-basic service set (BSS) and inter-BSS; and
    in response to determining that the first station is in an unassociated state, performing the carrier detection according to a second preset rule;
    wherein determining the home situation of the first radio frame according to the first attribute information carried in the first radio frame and the second attribute information corresponding to the first AP station comprises:
    acquiring the first attribute information carried in the first radio frame, wherein the first radio frame is sent by a second station to a second AP station with which the second station is associated, the first AP station and the second AP station each corresponds to a different BSS, the first AP station and the second AP station belong to a same multiple BSS set, the first attribute information comprises BSS identifier (BSSID), the second attribute information corresponding to the first AP station comprises BSSID, and a BSSID is used for identifying a corresponding BSS; and
    determining, according to the first attribute information and the second attribute information corresponding to the first AP station, whether the first radio frame is an intra-BSS radio frame to which the first station belongs to obtain the home situation of the first radio frame.

2. The method of claim 1, wherein determining, according to the first attribute information and the second attribute information corresponding to the first AP station, whether the first radio frame is the intra-BSS radio frame to which the first station belongs comprises:
    matching the first attribute information with attribute information of any BSS in the multiple BSS set, wherein in response to determining that the second attribute information matches the first attribute information, the first radio frame is determined to be the intra-BSS radio frame to which the first station belongs, and in response to determining that the second attribute information does not match the first attribute information, the first radio frame is determined not to be the intra-BSS radio frame to which the first station belongs.

3. The method of claim 1, wherein performing the carrier detection according to the first preset rule based on the home situation of the first radio frame comprises:
    in response to determining that the home situation indicates that the first radio frame is the intra-BSS radio frame to which the first station belongs, performing physical carrier detection using a first threshold, and updating an intra-BSS network allocation vector of the first station; and
    in response to determining that the home situation indicates that the first radio frame is an inter-BSS radio frame to which the first station belongs, performing the physical carrier detection using a second threshold, and updating a basic network allocation vector of the first station; wherein the first threshold is lower than or equal to the second threshold.

4. The method of claim 3, wherein updating the intra-BSS network allocation vector of the first station comprises:
    updating the intra-BSS network allocation vector of the first station according to reserved channel time information carried in the first radio frame; and
    wherein updating the basic network allocation vector of the first station comprises:
    updating the basic network allocation vector of the first station according to the reserved channel time information carried in the first radio frame.

5. The method of claim 1, wherein the first attribute information is partial BSS information of the second AP station in a partial association identifier field of the first radio frame, and the second attribute information is partial BSS information of any BSS in the multiple BSS set.

6. The method of claim 1, wherein determining whether the first station is in the associated state with the first AP station comprises:
   determining whether the first station is associated with the first AP station or has a target AP station desired to be associated with; and
   accordingly, wherein in response to determining that the first station is in the unassociated state, performing the carrier detection according to the second preset rule comprises:
   in response to determining that the first station is not associated with the first AP station or does not have the target AP station desired to be associated with, performing physical carrier detection using a first threshold, and updating a basic network allocation vector, or an intra-BSS network allocation vector, or both the basic network allocation vector and the intra-BSS network allocation vector of the first station.

7. A radio frame processing apparatus, comprising:
   a processor; and
   a memory for storing instructions executable by the processor,
   the processor is configured to implement the radio frame processing method of claim 1.

8. A radio frame processing method, applied to an access point (AP) station, comprising:
   after detecting a second radio frame, acquiring uplink and downlink identification information carried in the second radio frame, and acquiring network identification information carried in the second radio frame, wherein the network identification information belongs to a sender of the second radio frame, and the network identification information is a basic service set identifier (BSSID);
   determining, according to the uplink and downlink identification information and the network identification information, a home situation of the second radio frame, wherein the home situation is selected from intra-basic service set (BSS) and inter-BSS; and
   updating a network allocation vector of the AP station according to the home situation of the second radio frame;
   wherein determining, according to the uplink and downlink identification information and the network identification information, the home situation of the second radio frame comprises:
   after determining that the second radio frame is an uplink radio frame according to the uplink and downlink identification information, matching the network identification information belonging to the sender with network identification information of the AP station or network identification information of any BSS in a multiple BSS set to which the AP station belongs;
   in response to determining that the network identification information matches the network identification information of the AP station or the network identification information of any BSS in the multiple BSS set to which the AP station belongs, determining that the second radio frame is an intra-BSS radio frame to which the AP station belongs; and
   in response to determining that the network identification information does not match the network identification information of the AP station or the network identification information of any BSS in the multiple BSS set to which the AP station belongs, determining that the second radio frame is an inter-BSS radio frame to which the AP station belongs.

9. The method of claim 8, wherein updating the network allocation vector of the AP station according to the home situation of the second radio frame comprises:
   in response to determining that the home situation indicates that the second radio frame is an inter-BSS radio frame of a BSS to which the AP station belongs, updating a basic network allocation vector of the AP station; and
   accordingly, wherein the method further comprises:
   in response to determining that the home situation indicates that the second radio frame is an intra-BSS radio frame to which the AP station belongs, updating no network allocation vector of the AP station.

10. The method of claim 8, wherein determining, according to the uplink and downlink identification information and the network identification information, the home situation of the second radio frame comprises:
    after determining that the second radio frame is a downlink radio frame according to the uplink and downlink identification information, determining that the second radio frame is an inter-BSS radio frame to which the AP station belongs.

11. A radio frame processing apparatus, comprising:
    a processor; and
    a memory for storing instructions executable by the processor,
    the processor is configured to implement the radio frame processing method of claim 8.

* * * * *